United States Patent
Hayashida

(10) Patent No.: US 11,943,396 B2
(45) Date of Patent: Mar. 26, 2024

(54) INFORMATION PROCESSING SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Toshiharu Hayashida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/711,429

(22) Filed: Apr. 1, 2022

(65) Prior Publication Data

US 2023/0084666 A1 Mar. 16, 2023

(30) Foreign Application Priority Data

Sep. 15, 2021 (JP) ................................. 2021-150151

(51) Int. Cl.
*H04N 1/00* (2006.01)

(52) U.S. Cl.
CPC ..... *H04N 1/00228* (2013.01); *H04N 1/00214* (2013.01)

(58) Field of Classification Search
None
See application file for complete search history.

(56) References Cited

U.S. PATENT DOCUMENTS

| | | | | |
|---|---|---|---|---|
| 2002/0018237 A1* | 2/2002 | Okada | ................ | H04N 1/00206 358/440 |
| 2010/0214593 A1* | 8/2010 | Toda | .................. | H04N 1/00214 358/1.14 |
| 2012/0250099 A1* | 10/2012 | Kanemoto | ......... | H04N 1/32128 358/435 |
| 2015/0002895 A1* | 1/2015 | Nakatsuka | ............ | G06F 3/1229 358/1.15 |
| 2015/0092249 A1* | 4/2015 | Watanabe | .......... | H04N 1/32702 358/406 |

FOREIGN PATENT DOCUMENTS

| | | | | |
|---|---|---|---|---|
| JP | 2002189639 | * | 7/2002 | ............... G06F 3/12 |
| JP | 2002319982 | * | 10/2002 | ............... H04N 1/00 |
| JP | 2005136459 | * | 5/2005 | ............... H04N 1/00 |
| JP | 2010-061225 | * | 3/2010 | ............ G06F 13/00 |
| JP | 2010061225 | * | 3/2010 | ............ G06F 13/00 |
| JP | 2013165525 | * | 8/2013 | ............... H04N 1/00 |
| JP | 6465158 | * | 2/2019 | ............... H04N 1/00 |
| JP | 6708936 B2 | | 6/2020 | |
| KR | 20100032132 | * | 3/2010 | ......... H04N 1/00482 |

* cited by examiner

*Primary Examiner* — Beniyam Menberu
(74) *Attorney, Agent, or Firm* — Oliff PLC

(57) ABSTRACT

An information processing system includes: multiple terminal apparatuses; and a processing apparatus that processes transmission information transmitted from a terminal apparatus including the multiple terminal apparatuses and that generates post-processing information to be transmitted to a receiving apparatus via the terminal apparatus including the multiple terminal apparatuses, the terminal apparatus transmitting the transmission information to the processing apparatus and transmitting destination information regarding the receiving apparatus to the processing apparatus.

11 Claims, 13 Drawing Sheets

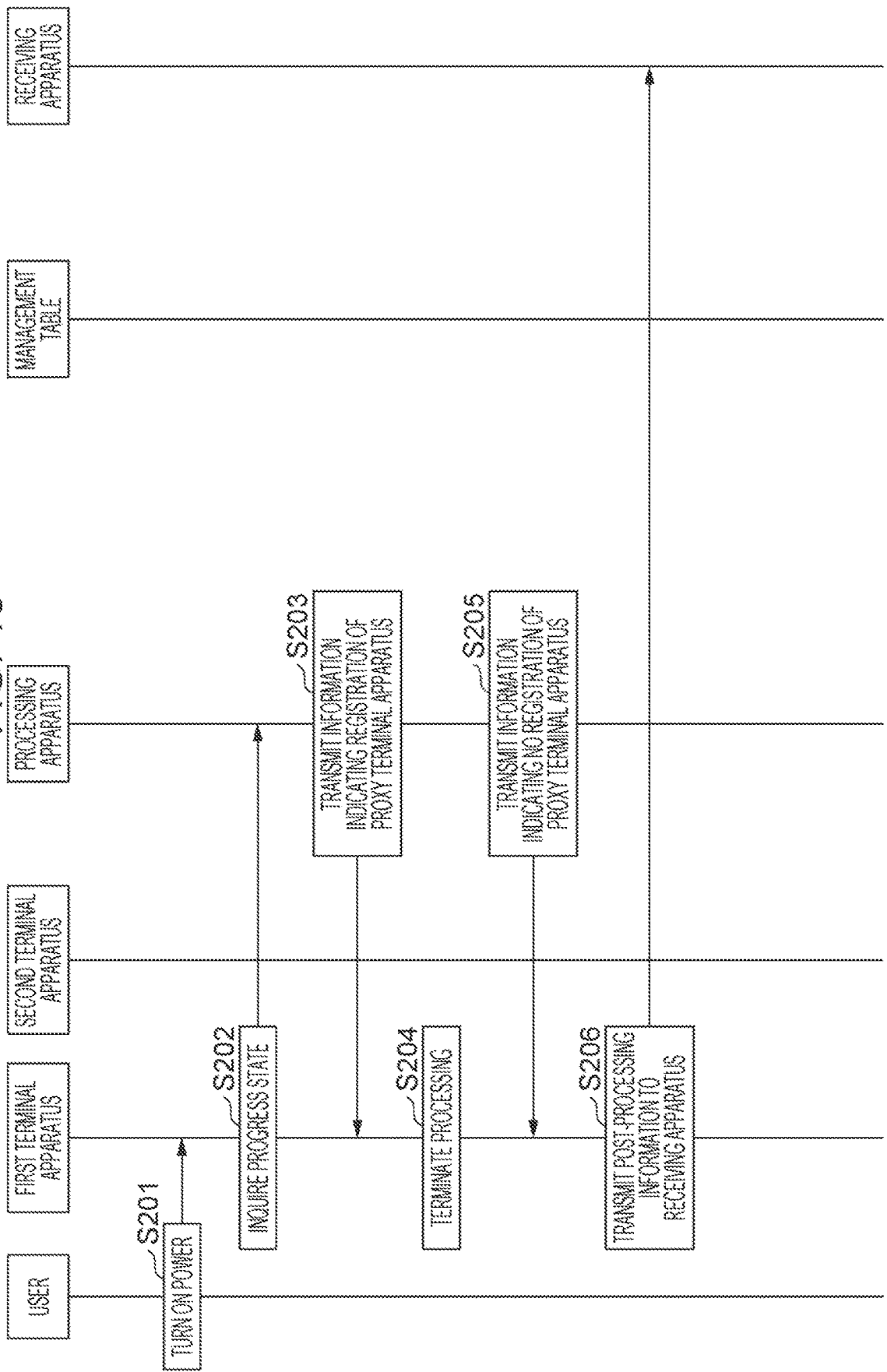

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-150151 filed Sep. 15, 2021.

BACKGROUND

(i) Technical Field

The present disclosure relates to an information processing system, an information processing apparatus, and a non-transitory computer readable medium.

(ii) Related Art

Japanese Patent No. 6708936 discloses a process in which a multi-function printer disconnects communication for a cloud printing service and then enters an energy save mode if a different multi-function printer able to serve as a proxy apparatus is present.

SUMMARY

Suppose a case where post-processing information processed by a processing apparatus is transmitted to a receiving apparatus via a terminal apparatus. If the terminal apparatus is turned off, or if the terminal apparatus has a high load, it is more appropriate to transit the post-processing information to the receiving apparatus via a different terminal apparatus.

In this case, if the different terminal apparatus does not have destination information regarding the receiving apparatus, it is possibly difficult to transmit the post-processing information to the receiving apparatus.

Aspects of non-limiting embodiments of the present disclosure relate to enabling transmission of information to a receiving apparatus even if a terminal apparatus to transmit the information to the receiving apparatus is changed to a different terminal apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: multiple terminal apparatuses; and a processing apparatus that processes transmission information transmitted from a terminal apparatus including the multiple terminal apparatuses and that generates post-processing information to be transmitted to a receiving apparatus via the terminal apparatus including the multiple terminal apparatuses, the terminal apparatus transmitting the transmission information to the processing apparatus and transmitting destination information regarding the receiving apparatus to the processing apparatus.

BRIEF DESCRIPTION OF THE DRAWINGS

An exemplary embodiment of the present disclosure will be described in detail based on the flowing figures, wherein:

FIG. 13 is a diagram explaining processing performed in a case where the first terminal apparatus in the power off state is turned on.

DETAILED DESCRIPTION

Hereinafter, an exemplary embodiment of the present disclosure will be described in detail with reference to the attached drawings.

Figure 1:
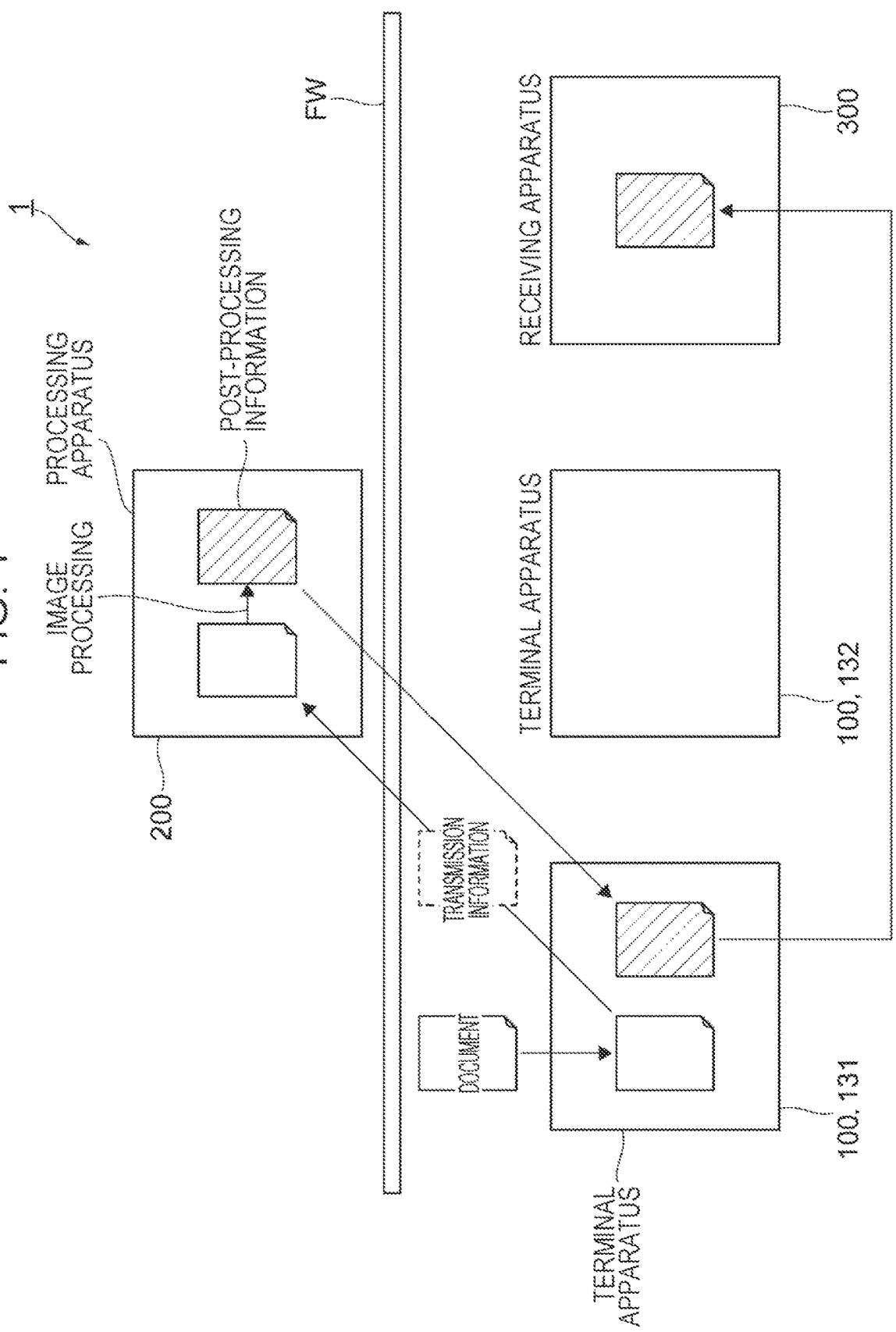
FIG. 1 is a diagram illustrating an example configuration of an information processing system.

FIG. 1 is a diagram illustrating an example configuration of an information processing system 1 of this exemplary embodiment.

The information processing system 1 of this exemplary embodiment includes terminal apparatuses 100 and a processing apparatus 200 that processes information (transmission information) transmitted from one of the terminal apparatuses 100.

The terminal apparatuses 100 are installed in a specific organization such as a company and connected to each other via a communication network (not illustrated). The communication network may be a wired communication network or a wireless communication network.

In this exemplary embodiment, a firewall FW is provided. The terminal apparatuses 100 are provided within the firewall FW, and the processing apparatus 200 is provided outside the firewall FW.

The processing apparatus 200 taken as an example of an information processing apparatus processes transmission information transmitted from each terminal apparatus 100 and generates post-processing information resulting from the processing.

In this exemplary embodiment, a receiving apparatus 300 that receives the post-processing information generated by the processing apparatus 200 is provided.

The receiving apparatus 300 is provided within the firewall FW. The receiving apparatus 300 is connected to the terminal apparatuses 100 via a communication network (not illustrated).

The communication network may also be a wired communication network or a wireless communication network.

In this exemplary embodiment, the post-processing information generated by the processing apparatus 200 is transmitted to the receiving apparatus 300 via one of the terminal apparatuses 100.

In other words, the post-processing information is routed to the receiving apparatus 300 through one of the terminal apparatuses 100.

The post-processing information is stored in the receiving apparatus 300.

Figure 2:
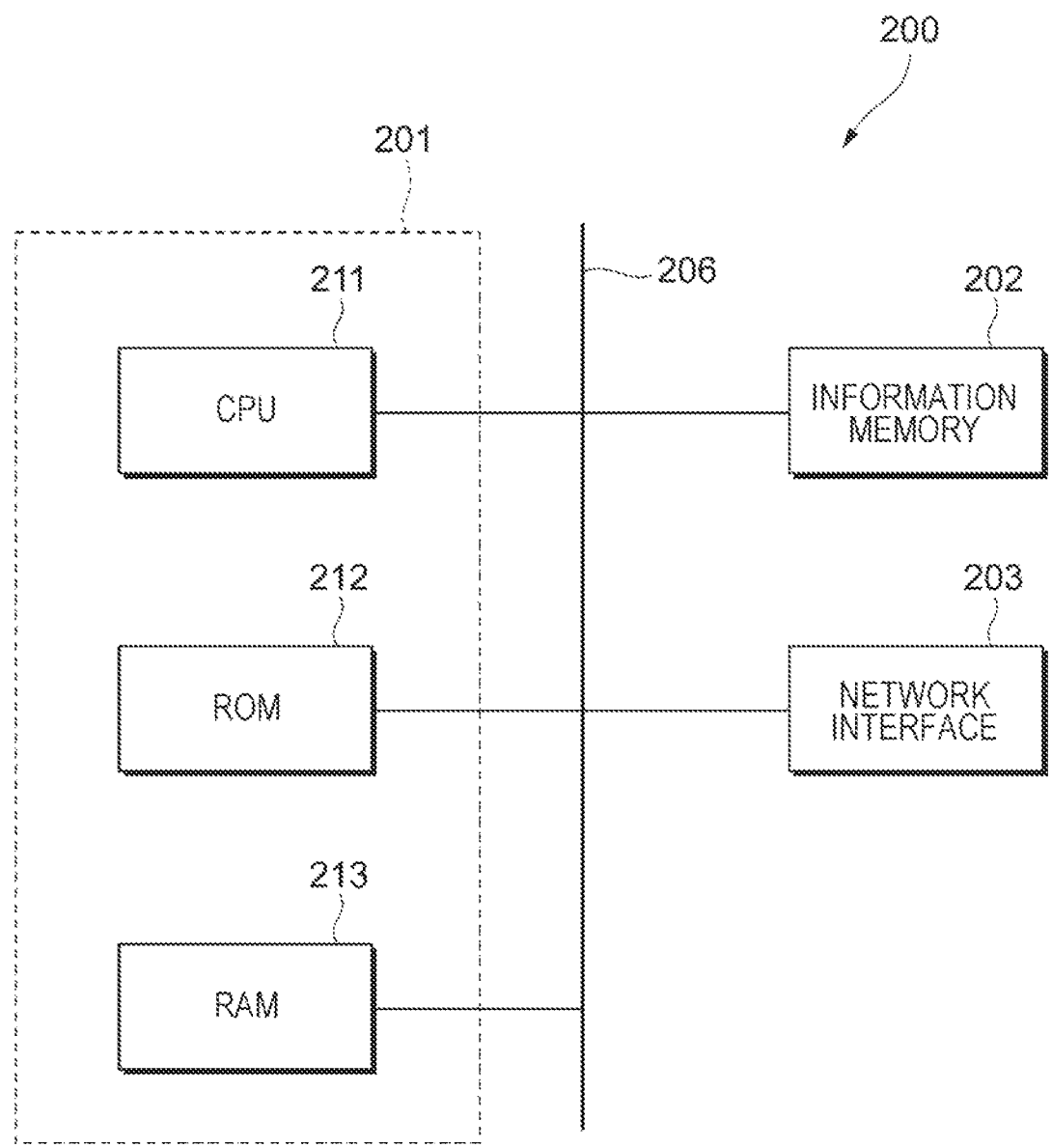
FIG. 2 is a diagram illustrating an example hardware configuration of a processing apparatus.

FIG. 2 is a diagram illustrating an example hardware configuration of the processing apparatus 200.

The processing apparatus 200 taken as the example of the information processing apparatus includes an information processing unit 201, an information memory 202 that stores information, and a network interface 203 that implements communication using a local area network (LAN) cable or the like.

The information processing unit 201 is configured as a computer.

The information processing unit 201 includes a central processing unit (CPU) 211 taken as an example of a processor configured to execute various processes (described later). The information processing unit 201 also includes a read only memory (ROM) 212 storing software and a random access memory (RAM) 213 used as a work area.

The information memory 202 is implemented by an existing information memory such as a semiconductor memory, a hard disk drive, or a magnetic tape.

The information processing unit 201, the information memory 202, and the network interface 203 are connected to each other via a bus 206 or a signal line (not illustrated).

A program run by the CPU 211 may be provided to the processing apparatus 200 in such a manner as to be stored in a computer readable recording medium such as a magnetic recording medium (such as a magnetic tape or a magnetic disk), an optical recording medium (such as an optical disk), a magneto-optical recording medium, or a semiconductor memory. The program run by the CPU 211 may be provided to the processing apparatus 200 by using a communication medium such as the Internet.

Each terminal apparatus 100 (see FIG. 1) has an image forming function of forming an image on a recording material such as paper. The terminal apparatus 100 may also be regarded as an image forming apparatus.

The terminal apparatus 100 includes a scanner and thus has an image reading function of reading an image on the document in addition to the image forming function.

The terminal apparatus 100 has a transmission and reception function of transmitting and receiving various pieces of information such as image data. The terminal apparatus 100 has a faxing function. The faxing function is implemented by the transmission and reception function.

Figure 3:
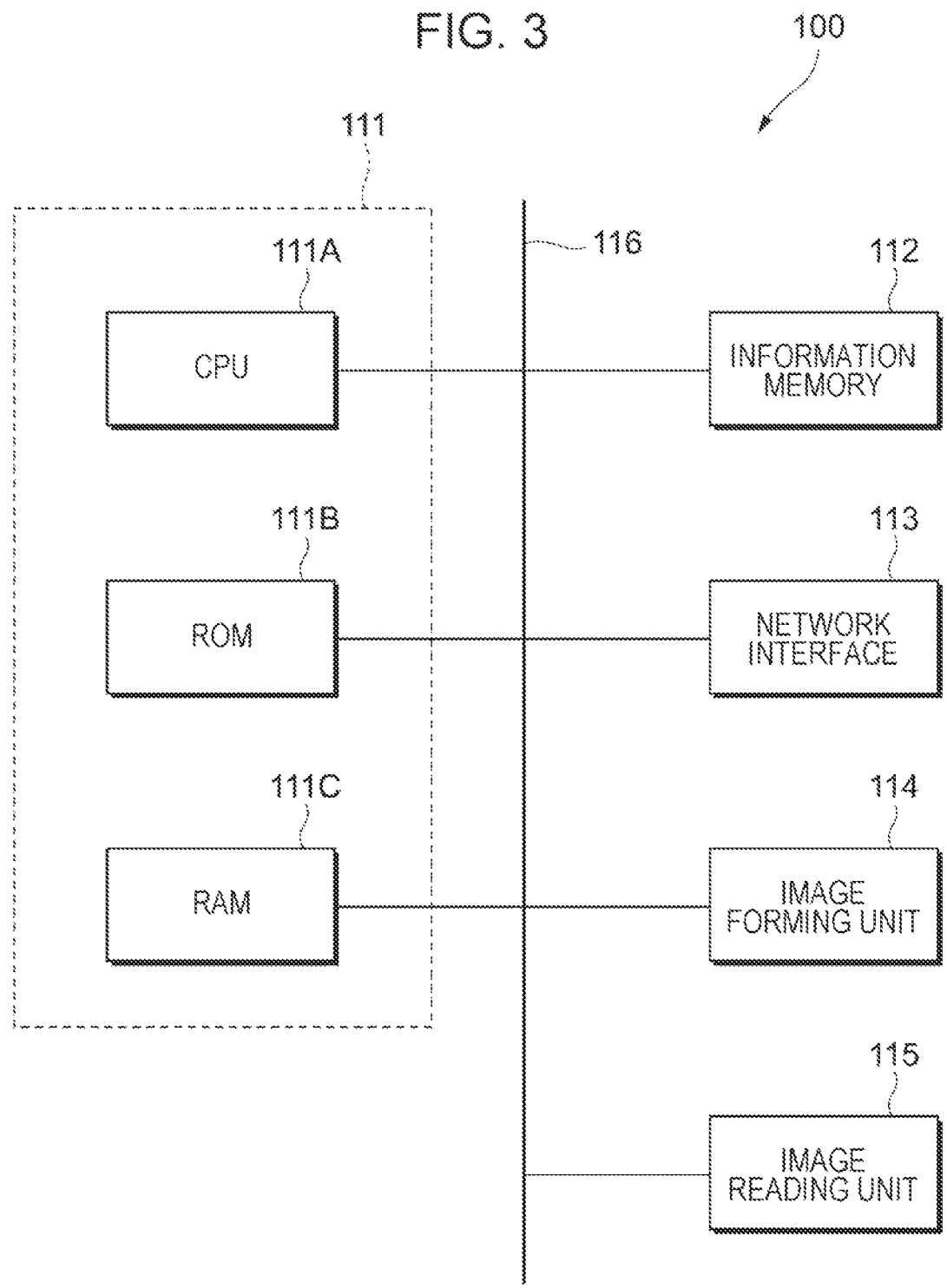
FIG. 3 is a diagram illustrating an example hardware configuration of a terminal apparatus.

FIG. 3 is a diagram illustrating an example hardware configuration of the terminal apparatus 100.

In the example configuration illustrated in FIG. 3, the terminal apparatus 100 is an image forming apparatus.

The terminal apparatus 100 includes an information processing unit 111, an information memory 112 that stores information, and a network interface 113 that implements communication using a LAN cable or the like.

The terminal apparatus 100 also includes an image forming unit 114 that forms an image on the recording material such as paper and an image reading unit 115 that reads an image on the document.

The information processing unit 111 is configured as a computer.

The information processing unit 111 includes a CPU 111A taken as an example of a processor configured to execute various processes (described later). The information processing unit 111 also includes a ROM 111B storing software and a RAM 111C used as a work area.

The information memory 112 is implemented by an existing information memory such as a hard disk drive, a semiconductor memory, or a magnetic tape.

The image forming unit 114 forms an image on the recording material such as paper by using an electrophotographic system or an inkjet system.

The image reading unit 115 includes the scanner and generates image data by reading the image on the document set on the scanner.

The information processing unit 111, the information memory 112, the network interface 113, the image forming unit 114, and the image reading unit 115 are connected to each other via a bus 116 or a signal line (not illustrated).

A program run by the CPU 111A may be provided to the terminal apparatus 100 in such a manner as to be stored in a computer readable recording medium such as a magnetic recording medium (such as a magnetic tape or a magnetic disk), an optical recording medium (such as an optical disk), a magneto-optical recording medium, or a semiconductor memory.

The program run by the CPU 111A may be provided to the terminal apparatus 100 by using a communication medium such as the Internet.

The term "processor" herein refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The term "processor" is broad enough to encompass one processor or plural processors in collaboration which are located physically apart from each other but may work cooperatively. The order of operations of the processor is not limited to one described in this embodiment, and may be changed.

The terminal apparatus 100 is not limited to the image forming apparatus and is configured as a personal computer (PC) or the like on occasions.

The terminal apparatus 100 may also be a portable apparatus other than these, such as a smartphone, a tablet terminal, a smart watch, or a gaming machine.

The terminal apparatuses 100 are not limited to apparatuses of the same type and may be apparatuses of multiple mixed types.

Although FIG. 1 illustrates the two terminal apparatuses 100, three terminal apparatuses 100 are also provided in some cases.

In addition, one of the terminal apparatuses 100 that transmits the transmission information to the processing apparatus 200 (see FIG. 1) may be the same as or may be different from one of the terminal apparatuses 100 that is to transmit, to the receiving apparatus 300, the post-processing information transmitted from the processing apparatus 200.

If the terminal apparatus 100 that transmits the transmission information to the processing apparatus 200 is the same as the terminal apparatus 100 to transmit the post-processing information to the receiving apparatus 300, the transmission information is transmitted from the terminal apparatus 100 that is one of the terminal apparatuses 100 to the processing apparatus 200 as illustrated in FIG. 1. The post-processing information is then transmitted to the receiving apparatus 300 via the terminal apparatus 100.

In other words, if the terminal apparatus 100 that transmits the transmission information to the processing apparatus 200 is the same as the terminal apparatus 100 to transmit the post-processing information to the receiving apparatus 300, the post-processing information is returned to the terminal apparatus 100 that has transmitted the transmission information to the processing apparatus 200.

The post-processing information is transmitted to the receiving apparatus 300 via the terminal apparatus 100.

If one of the terminal apparatuses 100 that transmits the transmission information to the processing apparatus 200 is different from the terminal apparatus 100 to transmit the post-processing information to the receiving apparatus 300, the transmission information is transmitted to the processing apparatus 200 from the terminal apparatus 100 that transmits the transmission information.

The post-processing information is then transmitted to the receiving apparatus 300 via the different terminal apparatus 100 different from the terminal apparatuses 100.

In this case, the post-processing information is transmitted to the receiving apparatus 300 via the different terminal apparatus 100 different from the terminal apparatus 100.

Figure 4:
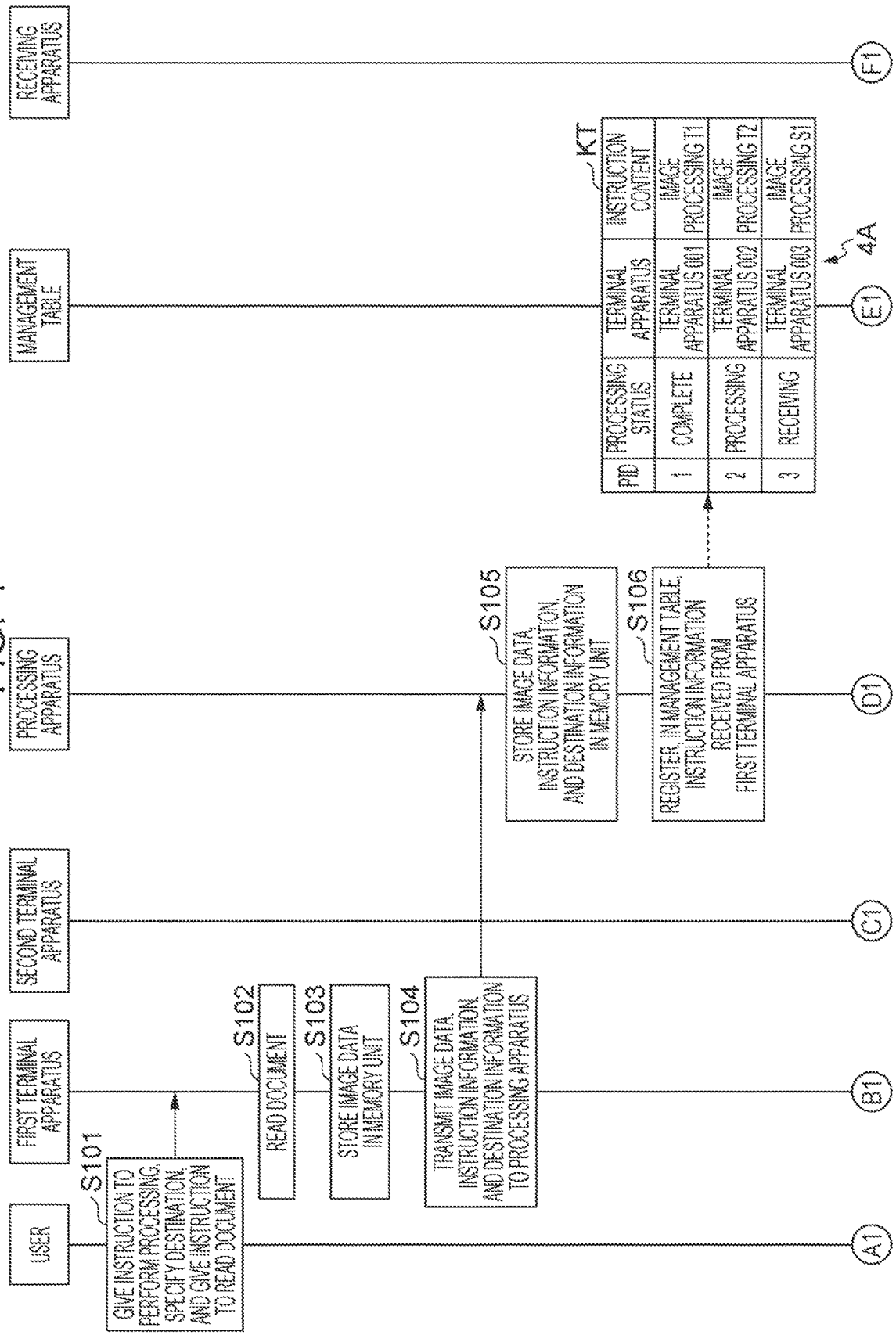
FIG. 4 is a diagram illustrating the basic flow of processing by the information processing system.
Figure 5:
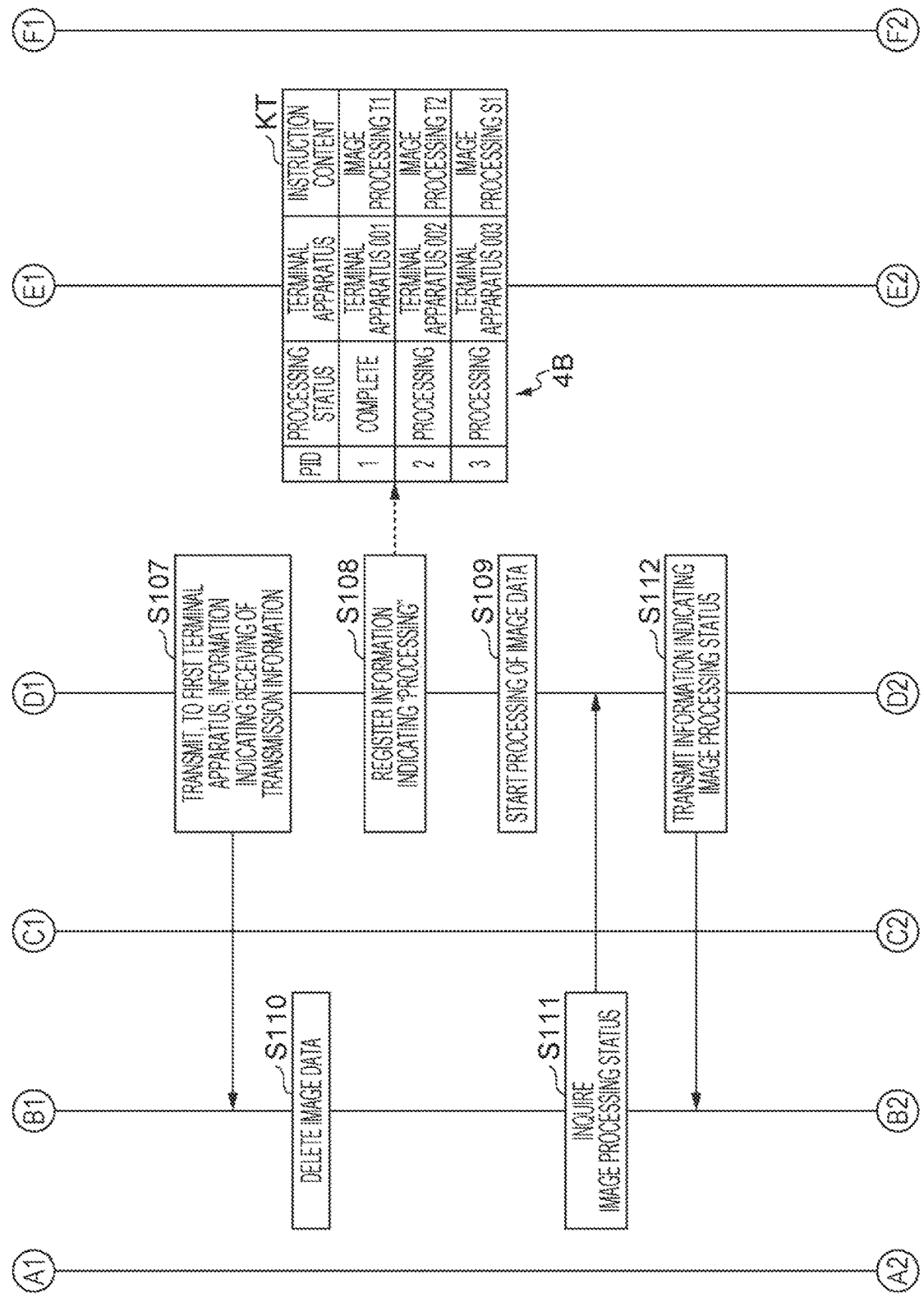
FIG. 5 is a diagram illustrating the basic flow of the processing by the information processing system.
Figure 6:
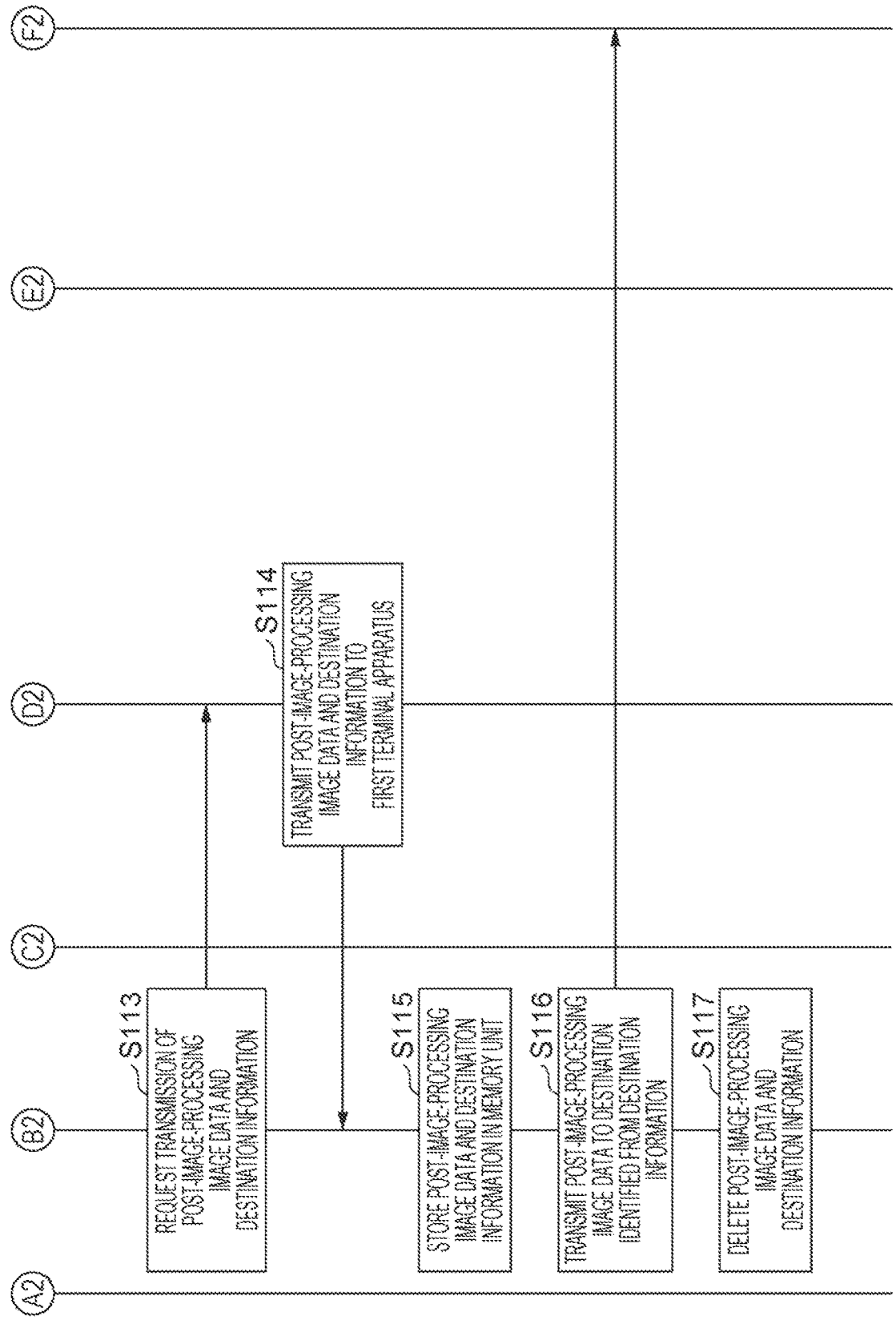
FIG. 6 is a diagram illustrating the basic flow of the processing by the information processing system.

FIGS. 4 to 6 are diagrams illustrating the basic flow of processing by the information processing system 1. The processing illustrated in FIGS. 4 to 6 will be described also with reference to FIG. 1.

In this exemplary embodiment, to a first terminal apparatus 131 (see FIG. 1) that is one of the terminal apparatuses 100, a user first gives an instruction to perform image processing, specifies a destination, and an instruction to read a document (step S101).

In response to this, the first terminal apparatus 131 reads the document set on the first terminal apparatus 131 by the user (step S102) and stores image data acquired by the reading in a memory unit (step S103). The memory unit is implemented by the information memory 112 (see FIG. 3).

The first terminal apparatus 131 then transmits, to the processing apparatus 200, the image data, information regarding the image processing instruction (hereinafter, instruction information), and destination information that is information regarding the transmission destination (step S104).

In other words, the first terminal apparatus 131 transmits the image data, the instruction information, and the destination information to the processing apparatus 200 serving as an external apparatus.

More specifically, in this exemplary embodiment, in step S104, the CPU 111A (see FIG. 3) of the first terminal apparatus 131 performs processing for transmitting the image data to the processing apparatus 200. The CPU 111A is taken as an example of the processor, and the image data is taken as an example of information processed by the processing apparatus 200.

In step S104, the CPU 111A also transmits, to the processing apparatus 200, the destination information regarding the receiving apparatus 300 (see FIG. 1) to receive the post-processing information.

The receiving apparatus 300 (see FIG. 1) of this exemplary embodiment receives the post-processing information that is generated by the processing apparatus 200 and that is transmitted via the first terminal apparatus 131 or a different terminal apparatus 100 different from the first terminal apparatus 131 (described in detail later).

In step S104, the CPU 111A also performs processing for transmitting the instruction information to the processing apparatus 200.

The way of transmitting the destination information to the processing apparatus 200 is not particularly limited, and, for example, the destination information itself may be transmitted from the first terminal apparatus 131 to the processing apparatus 200.

Alternatively, for example, an image representing the destination information, such as a two-dimensional code, is formed on the document set on the first terminal apparatus 131 on occasions. In this case, when the document is read, the image representing the destination information is also read, and thus image data acquired by reading the document includes the destination information.

In this case, transmitting the image data to the processing apparatus 200 causes the destination information to be transmitted to the processing apparatus 200. In this case, the processing apparatus 200 acquires the destination information in such a manner as to analyze the image data.

The processing example illustrated in FIGS. 4 to 6 assumes that the user specifies the receiving apparatus 300 illustrated in FIG. 1, as the transmission destination of the post-processing information. In this case, information indicating the receiving apparatus 300 is transmitted as the destination information to the processing apparatus 200 in this exemplary embodiment.

Although FIG. 1 illustrates the only one receiving apparatus 300, receiving apparatuses 300 are provided on occasions. In this case, the user specifies one of the receiving apparatuses 300 that is to serve as the transmission destination of the post-processing information.

In this case, the destination information indicating as the destination the receiving apparatus 300 specified by the user is transmitted to the processing apparatus 200.

In this exemplary embodiment, the destination information is used, and the post-processing information generated by the processing apparatus 200 is transmitted to the receiving apparatus 300 identified from the destination information (described later).

In this exemplary embodiment, to transmit the transmission information from the first terminal apparatus 131 to the processing apparatus 200, the destination information is transmitted to the processing apparatus 200.

The destination identified from the destination information is the receiving apparatus 300 to which the post-processing information is finally transmitted.

In this exemplary embodiment, the destination information regarding the receiving apparatus 300 to receive the post-processing information is transmitted, to the processing apparatus 200, from the first terminal apparatus 131 that transmits the transmission information to the processing apparatus 200.

In this exemplary embodiment, every time the transmission information is transmitted, to the processing apparatus 200, from the terminal apparatus 100 that transmits the transmission information to the processing apparatus 200, the destination information is transmitted from the terminal apparatus 100 to the processing apparatus 200.

In other words, in this exemplary embodiment, every time the image data acquired by the terminal apparatus 100 is transmitted to the processing apparatus 200, the destination information is transmitted from the terminal apparatus 100 to the processing apparatus 200.

After receiving the image data, the instruction information, and the destination information from the first terminal apparatus 131, the processing apparatus 200 stores the pieces of information in the memory unit (step S105). In this exemplary embodiment, the memory unit is implemented by the information memory 202 (see FIG. 2).

More specifically, in this exemplary embodiment, the CPU 211 (see FIG. 2) of the processing apparatus 200 acquires the image data, the instruction information, and the destination information that are output from the first terminal apparatus 131 taken as an example of one of the terminal apparatuses 100, and the pieces of information are stored in the memory unit.

The processing apparatus 200 then registers the instruction information received from the first terminal apparatus 131 in a management table KT (see 4A in FIG. 4) of the processing apparatus 200 (step S106). Specifically, in this example, the processing apparatus 200 registers, as the instruction information, the information "image processing S1" indicating execution of image processing.

In this processing example, a terminal apparatus 003 in the management table KT corresponds to the first terminal apparatus 131.

The processing apparatus 200 then transmits, to the first terminal apparatus 131, the information indicating that the transmission information from the first terminal apparatus 131 is received (step S107).

As illustrated by 4B in FIG. 5, the processing apparatus 200 then registers the information "Processing" indicating that the image data is being processed in the field associated with the first terminal apparatus 131 in the column "Processing Status" of the management table KT (step S108).

The processing apparatus 200 then starts the processing of the image data transmitted from the first terminal apparatus 131 (step S109).

In other words, the processing apparatus 200 starts the image processing of the image data transmitted from the first terminal apparatus 131.

More specifically, in this exemplary embodiment, the CPU 211 (see FIG. 2) included in the processing apparatus 200 performs predetermined processing of the image data that is information output from the first terminal apparatus 131 taken as an example of one of the terminal apparatuses 100. The CPU 211 is taken as an example of the processor.

The post-processing information is thereby generated in this exemplary embodiment.

After receiving the information indicating that the transmission information is received from the processing apparatus 200, the first terminal apparatus 131 deletes the image data stored in the memory unit (step S110).

In other words, the first terminal apparatus 131 deletes the image data having transmitted to the processing apparatus 200 and stored in the memory unit of the first terminal apparatus 131.

The first terminal apparatus 131 inquires the status of the image processing performed by the processing apparatus 200 of the processing apparatus 200 every time predetermined time has elapsed (step S111).

In response to the inquiry about the status, the processing apparatus 200 transmits the information indicating the image processing status to the first terminal apparatus 131 (step S112).

Specifically, the processing apparatus 200 transmits, to the first terminal apparatus 131, the information indicating the status of the image processing performed of the image data transmitted from the first terminal apparatus 131.

The first terminal apparatus 131 thereby identifies the status of the image processing performed by the processing apparatus 200.

If the identified image processing status is determined as a status in which the processing is complete, the first terminal apparatus 131 requests the processing apparatus 200 to transmit the post-image-processing image data and the destination information (step S113).

In other words, in this case, the first terminal apparatus 131 transmits, to the processing apparatus 200, information to cause the processing apparatus 200 to transmit, to the first terminal apparatus 131, the result of the processing by the processing apparatus 200 and the destination information.

In response to the request, the processing apparatus 200 transmits the post-image-processing image data and the destination information to the first terminal apparatus 131 (step S114).

The first terminal apparatus 131 receives the post-image-processing image data and the destination information transmitted from the processing apparatus 200 and stores the pieces of information in the memory unit (step S115).

The first terminal apparatus 131 then transmits the post-image-processing image data to the destination identified from the destination information (step S116).

In this exemplary embodiment, the destination identified from the destination information indicates the receiving apparatus 300 illustrated in FIG. 1, and thus the first terminal apparatus 131 transmits the post-image-processing image data to the receiving apparatus 300.

In this exemplary embodiment, the receiving apparatus 300 is a server, and the first terminal apparatus 131 transmits the post-image-processing image data to the receiving apparatus 300 as the server. The receiving apparatus 300 then receives the image data and stores the image data in the memory unit of the receiving apparatus 300.

The post-image-processing image data is thereby accumulated in the receiving apparatus 300 in this exemplary embodiment.

In this exemplary embodiment, the first terminal apparatus 131 thereafter deletes the post-image-processing image data and the destination information stored in the memory unit of the first terminal apparatus 131 (step S117).

FIGS. 7 to 12 are diagrams explaining the flow of processing performed in a case where the first terminal apparatus 131 is turned off.

Figure 7:
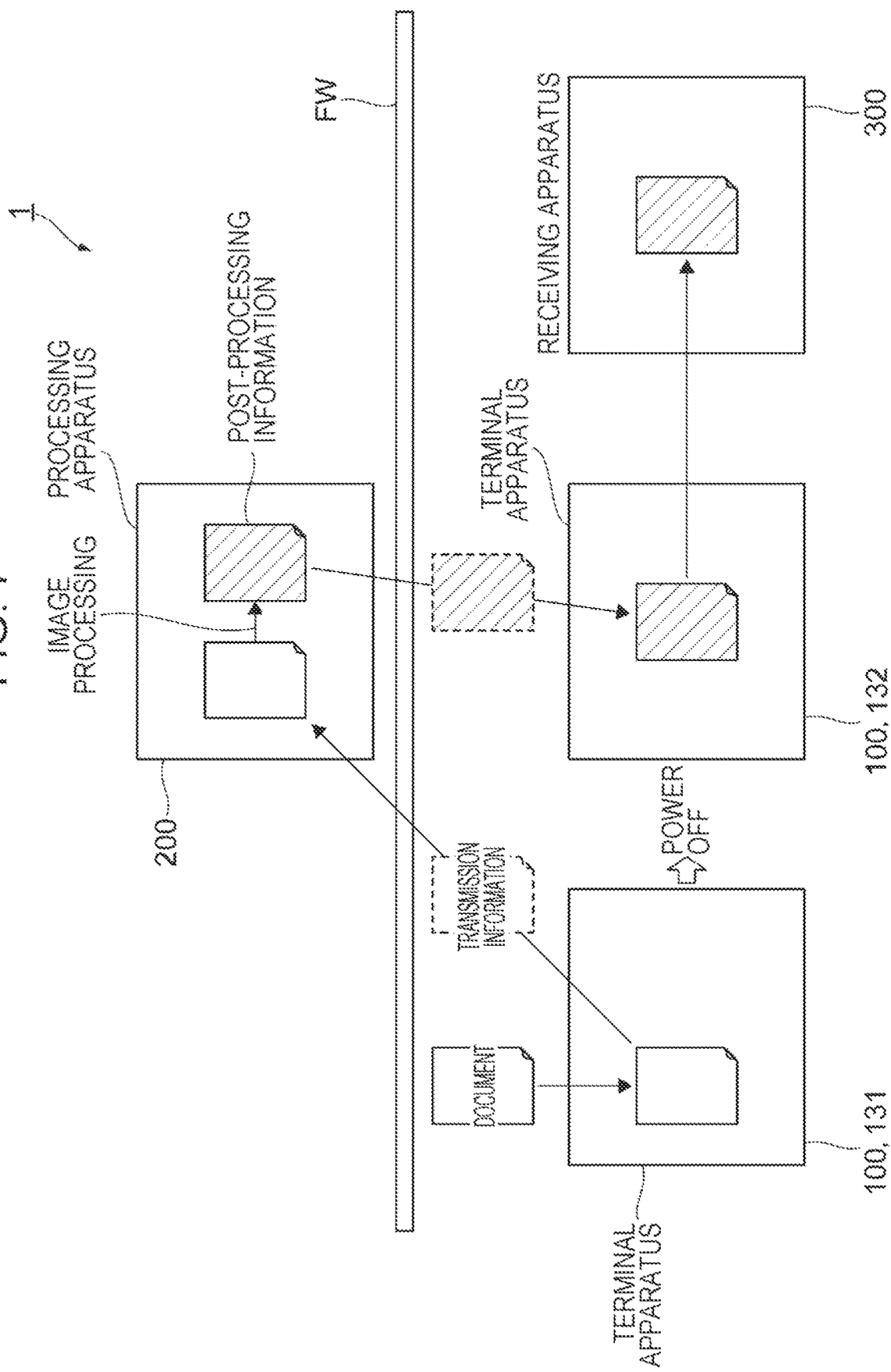
FIG. 7 is a diagram explaining the flow of processing performed in the case where a first terminal apparatus is turned off.

FIG. 7 illustrates the information processing system 1 with the first terminal apparatus 131 turned off. FIGS. 8 to 12 illustrate the processing performed in the case where the first terminal apparatus 131 is turned off.

Hereinafter, the processing performed in the case where the first terminal apparatus 131 is turned off after the transmission information is transmitted from the first terminal apparatus 131 (see FIG. 7) to the processing apparatus 200 will be described.

Figure 8:
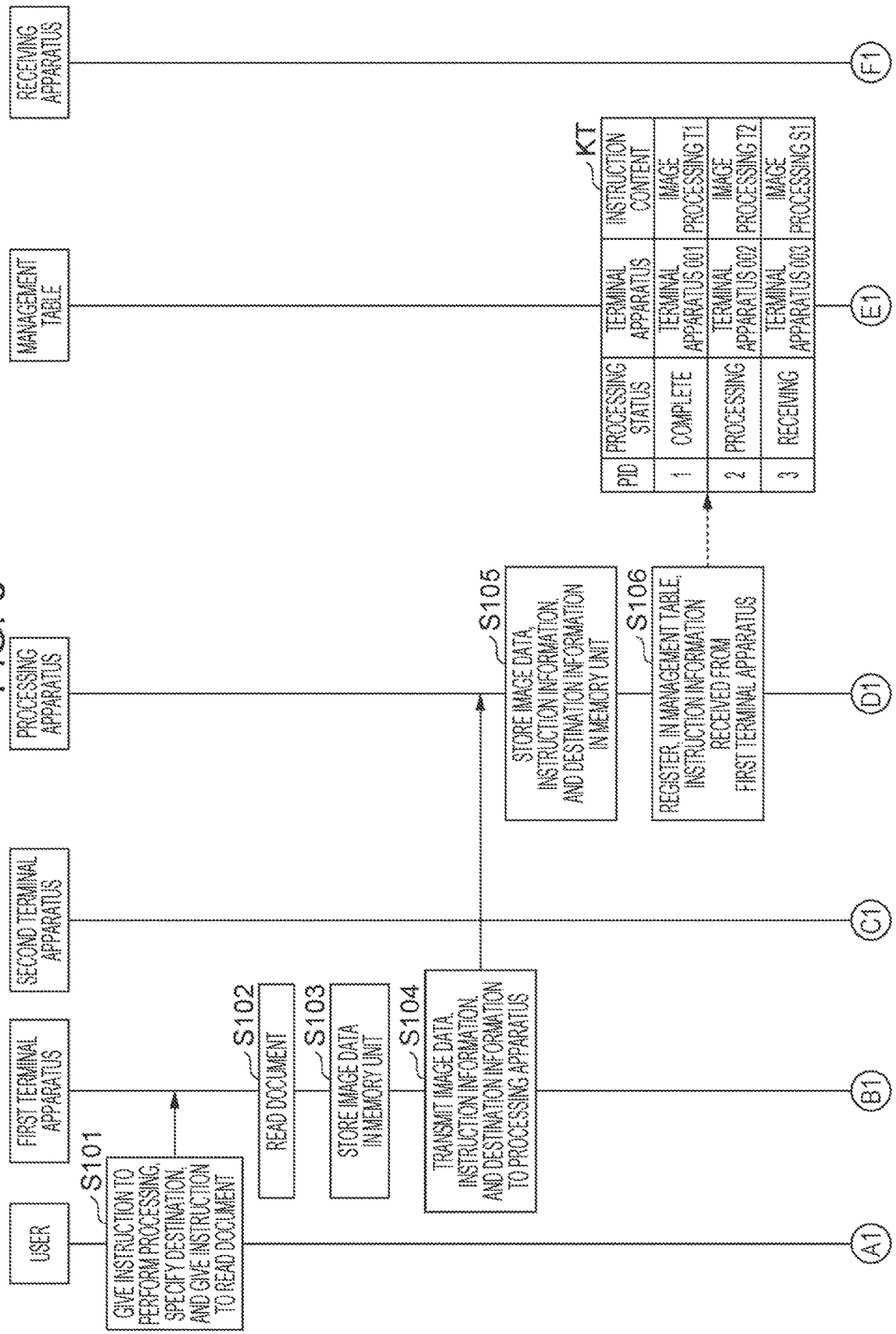
FIG. 8 is a diagram explaining the flow of the processing performed in the case where the first terminal apparatus is turned off.
Figure 9:
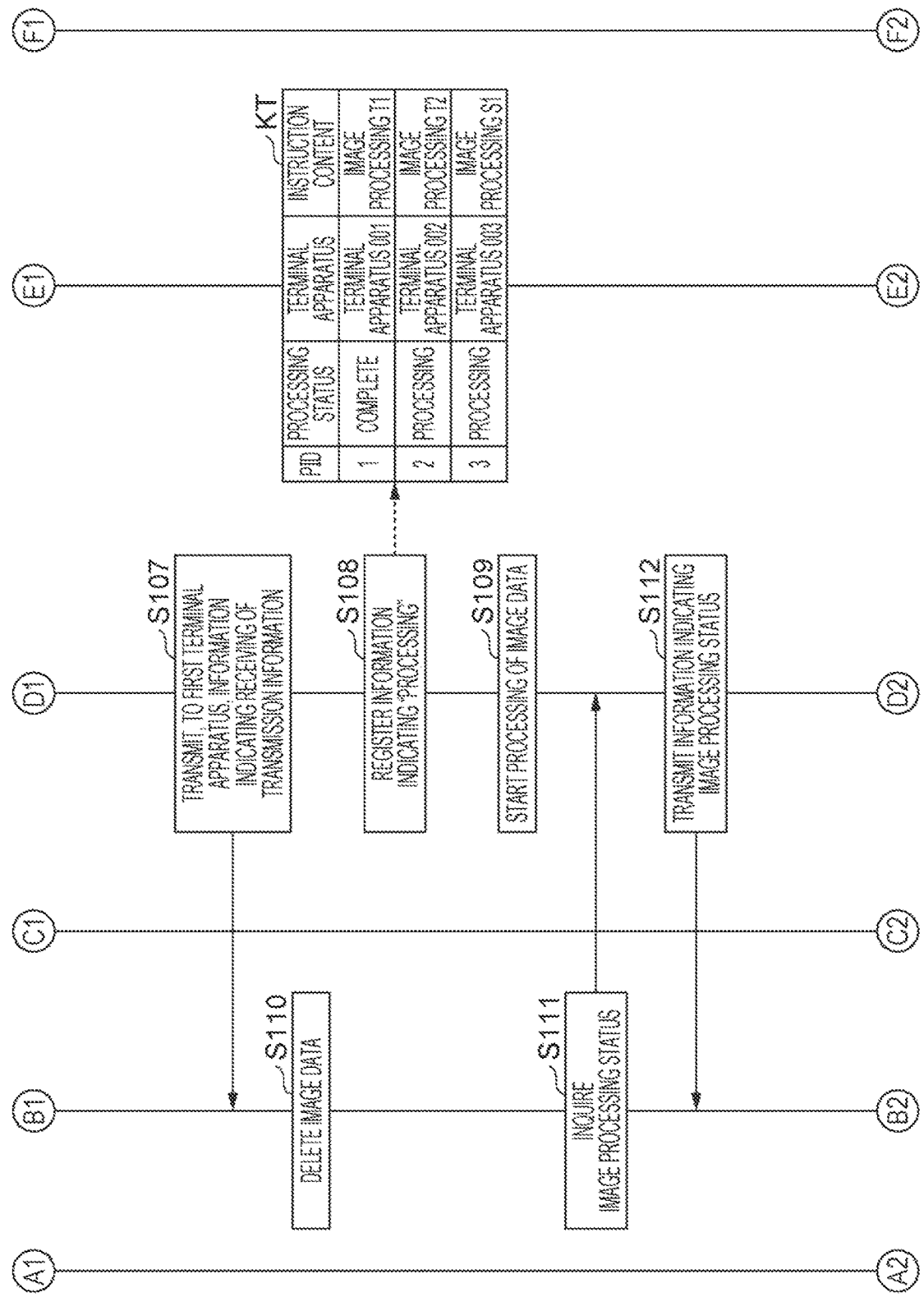
FIG. 9 is a diagram explaining the flow of the processing performed in the case where the first terminal apparatus is turned off.

Steps S101 to S112 illustrated in FIGS. 8 and 9 are the same as steps S101 to S112 illustrated in FIGS. 4 and 5.

FIGS. 8 to 12 illustrate the flow of the processing performed in the case where the first terminal apparatus 131 is turned off after step S112 (see FIG. 9).

Figure 10:
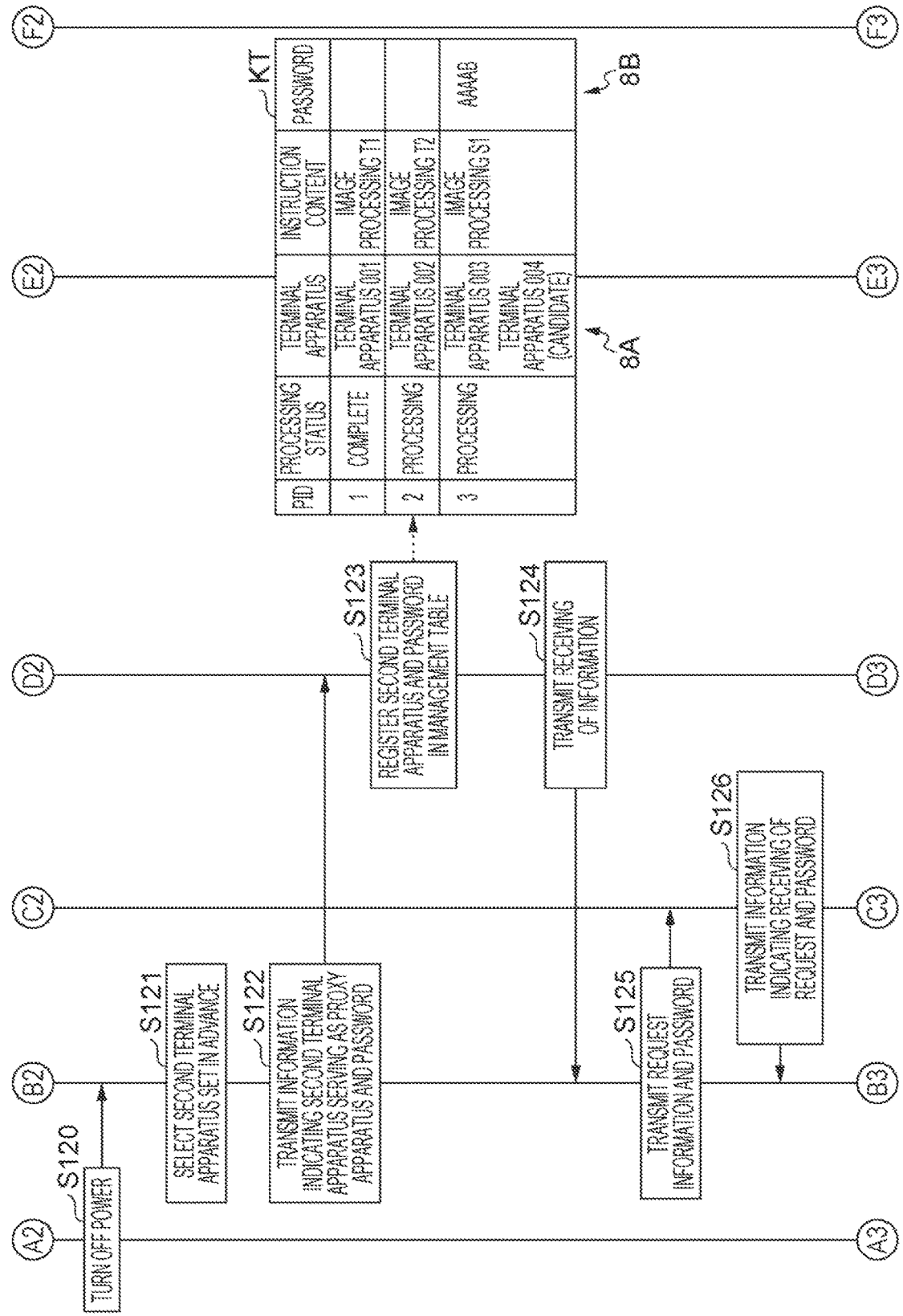
FIG. 10 is a diagram explaining the flow of the processing performed in the case where the first terminal apparatus is turned off.

Steps S101 to S112 in FIGS. 8 and 9 are the same as steps S101 to S112 in FIGS. 4 and 5, and thus steps starting from step S120 in FIG. 10 will herein be described.

In step S120 in FIG. 10, the user performs an operation for turning off the first terminal apparatus 131 (see FIG. 7).

In this exemplary embodiment, in the case where the first terminal apparatus 131 is turned off, the first terminal apparatus 131 requests a different terminal apparatus 100 to serve as a proxy apparatus.

The post-processing information from the processing apparatus 200 is thereby transmitted to the receiving apparatus 300 by the different terminal apparatus 100 serving as the proxy apparatus.

In this exemplary embodiment, if the user performs the operation for turning off the first terminal apparatus 131, the first terminal apparatus 131 selects a different terminal apparatus 100 set in advance (hereinafter, referred to as a second terminal apparatus 132) (see FIG. 7) (step S121).

In this processing example, as the different terminal apparatus 100 to transmit the post-processing information to the receiving apparatus 300 on behalf of the first terminal apparatus 131, the second terminal apparatus 132 is set in advance by the user, and information identifying the second terminal apparatus 132 has been registered in the first terminal apparatus 131.

In this processing example, if the user performs the power off operation, the first terminal apparatus 131 selects the second terminal apparatus 132.

The first terminal apparatus 131 transmits, to the processing apparatus 200, information indicating that the second terminal apparatus 132 serves as the proxy apparatus and a password taken as an example of an identification (step S122).

After receiving the information indicating that the second terminal apparatus 132 serves as the proxy apparatus and the password, the processing apparatus 200 registers, in the management table KT, the second terminal apparatus 132 as a candidate for the transmission destination of the post-processing information, as illustrated by 8A in FIG. 10 (step S123).

As illustrated by 8A in FIG. 10, the information "terminal apparatus 004" associated with the second terminal apparatus 132 is registered in the management table KT.

After receiving the information indicating that the second terminal apparatus 132 serves as the proxy apparatus and the password, the processing apparatus 200 also registers the password in the management table KT as illustrated by 8B in FIG. 10 (step S123).

The password is thereby registered in the management table KT.

After receiving the information indicating that the second terminal apparatus 132 serves as the proxy apparatus and the password, the processing apparatus 200 transmits the information indicating that the information is received to the first terminal apparatus 131 (step S124).

The first terminal apparatus 131 then transmits, to the second terminal apparatus 132, information requesting the transmission of the post-processing information to the receiving apparatus 300 (hereinafter, referred to as request information) and the password serving as the identification (step S125).

The password transmitted from the first terminal apparatus 131 to the second terminal apparatus 132 coincides with the password transmitted from the first terminal apparatus 131 to the processing apparatus 200.

After receiving the request information and the password, the second terminal apparatus 132 transmits the information indicating the request is received and the information indicating that the password is received to the first terminal apparatus 131 (step S126).

The first terminal apparatus 131 then performs an operation for turning off the first terminal apparatus 131 (step S127).

Thereafter, the second terminal apparatus 132 transmits, to the processing apparatus 200, the password received from the first terminal apparatus 131 and an acquisition request for the post-image-processing image data (step S128).

The processing apparatus 200 then receives the password and the acquisition request transmitted from the second terminal apparatus 132.

The processing apparatus 200 then collates the password received from the first terminal apparatus 131 with the password received from the second terminal apparatus 132 (step S129).

In other words, the processing apparatus 200 collates the password acquired in step S122 with the password in step S128.

Figure 11:
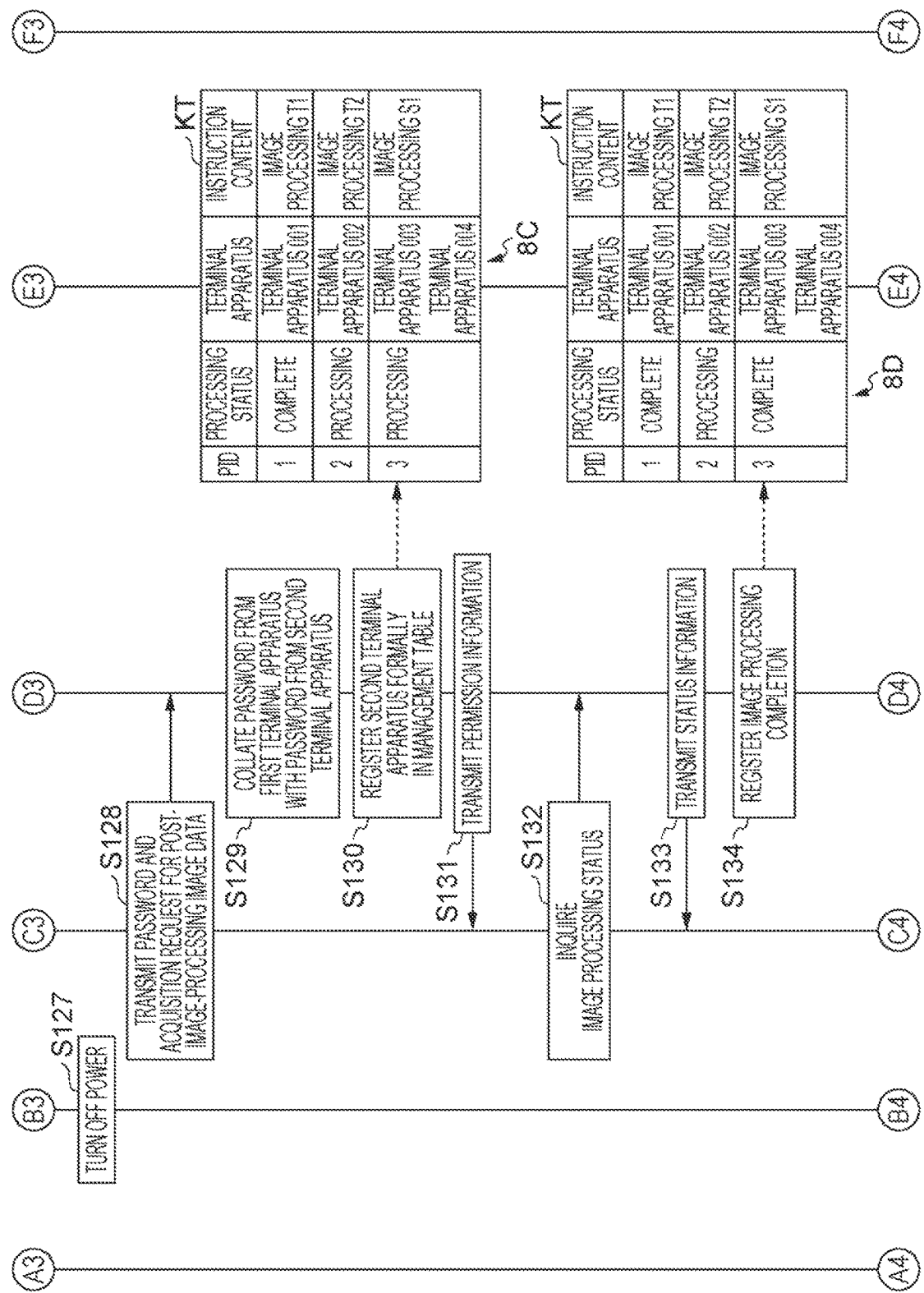
FIG. 11 is a diagram explaining the flow of the processing performed in the case where the first terminal apparatus is turned off.

If the passwords match, the processing apparatus 200 formally registers the second terminal apparatus 132 in the field in the terminal apparatus column in the management table KT, as illustrated by 8C in FIG. 11 (step S130). Specifically, the processing apparatus 200 formally registers the information "terminal apparatus 004".

The processing apparatus 200 then transmits information (hereinafter, referred to as permission information) indicating that acquisition of the post-image-processing image data is permitted (step S131) to the second terminal apparatus 132.

After receiving the permission information from the processing apparatus 200, the second terminal apparatus 132 inquires of the processing apparatus 200 about the image processing status every time predetermined time has elapsed (step S132).

In response to the inquiry from the second terminal apparatus 132, the processing apparatus 200 transmits the information regarding the image processing status (hereinafter, referred to as status information) to the second terminal apparatus 132 (step S133). The second terminal apparatus 132 then receives the status information.

In this exemplary embodiment, steps S132 and S133 are performed every time the predetermined time has elapsed.

In this exemplary embodiment, after the processing apparatus 200 completes the image processing, the CPU 211 of the processing apparatus 200 (see FIG. 2) registers information indicating that the image processing is complete (step S134) in the management table KT, as illustrated by 8D in FIG. 11.

In this case, the processing apparatus 200 transmits the information indicating that the image processing is complete to the second terminal apparatus 132.

More specifically, in this exemplary embodiment, the second terminal apparatus 132 inquires of the processing apparatus 200 about the image processing status every time the predetermined time has elapsed, as described above.

If the image processing is complete at the time of the inquiry, the information indicating that the image processing is complete is transmitted to the second terminal apparatus 132.

In response to this, in this exemplary embodiment, the second terminal apparatus 132 transmits, to the processing apparatus 200, information requesting the transmission of the destination information and the post-image-processing image data (step S135).

In response to this, the processing apparatus 200 transmits the destination information and the post-image-processing image data to the second terminal apparatus 132 (step S136).

In this exemplary embodiment, the destination information is thereby transmitted from the processing apparatus 200 to the second terminal apparatus 132, and the post-processing information composed of the post-image-processing image data is transmitted from the processing apparatus 200 to the second terminal apparatus 132, as illustrated in FIG. 7.

If the post-processing information is transmitted to the receiving apparatus 300 via the second terminal apparatus 132 taken as an example of the different terminal apparatus 100, the CPU 211 of the processing apparatus 200 transmits the destination information to the second terminal apparatus 132 that is the different terminal apparatus 100.

Figure 12:
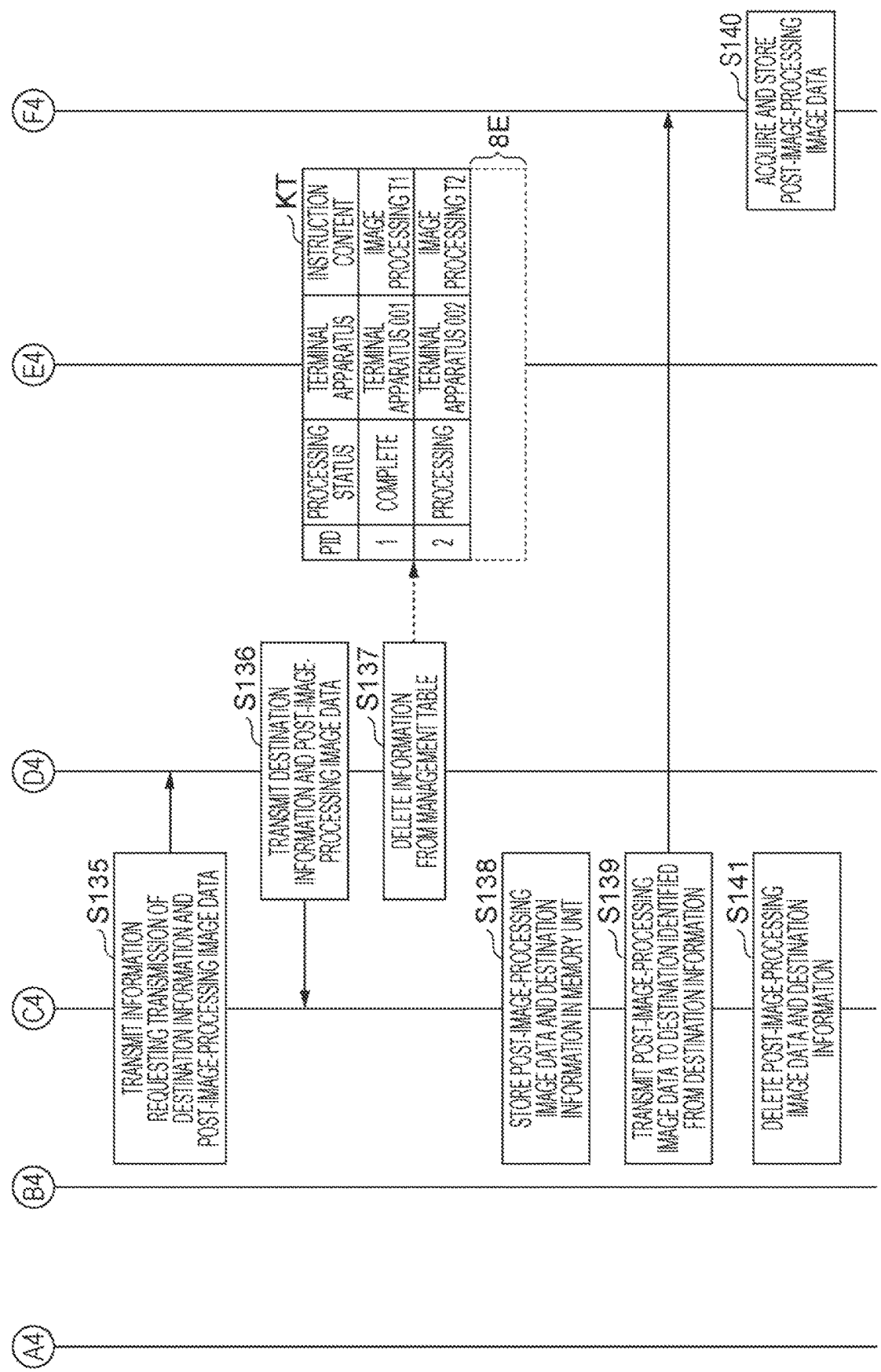
FIG. 12 is a diagram explaining the flow of the processing performed in the case where the first terminal apparatus is turned off.

Thereafter, as illustrated by 8E in FIG. 12, the processing apparatus 200 deletes, from the management table KT, information related to the image data transmitted from the first terminal apparatus 131 to the processing apparatus 200 (step S137).

In this exemplary embodiment, the second terminal apparatus 132 receives the post-image-processing image data and the destination information and stores the post-image-processing image data and the destination information in the memory unit of the second terminal apparatus 132 (step S138).

Thereafter, the second terminal apparatus 132 transmits, to the destination identified from the received destination information, the post-image-processing image data transmitted from the processing apparatus 200 (step S139).

In this exemplary embodiment, the destination identified from the destination information is the receiving apparatus 300 as described above, and the second terminal apparatus 132 transmits the post-image-processing image data taken as an example of post-processing information to the receiving apparatus 300, as illustrated in FIG. 7.

The receiving apparatus 300 then acquires and stores the post-image-processing image data (step S140).

The second terminal apparatus 132 then deletes the post-image-processing image data and the destination information stored in the memory unit of the second terminal apparatus 132 (step S141).

In this exemplary embodiment, as described above, if the password held by the processing apparatus 200 matches the password held by the second terminal apparatus 132, the post-image-processing image data taken as an example of the post-processing information is transmitted from the processing apparatus 200 to the second terminal apparatus 132.

After receiving the post-image-processing image data, the second terminal apparatus 132 transmits the post-image-processing image data to the receiving apparatus 300. The post-image-processing image data is thereby stored in the receiving apparatus 300.

In this exemplary embodiment, in the case where the first terminal apparatus 131 is turned off as described above, the post-processing information is transmitted to the receiving apparatus 300 via the second terminal apparatus 132 serving as the proxy apparatus, not via the first terminal apparatus 131.

In this exemplary embodiment, the opportunity of the proxy apparatus request made in the case where the first terminal apparatus 131 is turned off is described taken as an example as described above.

The opportunity of the proxy apparatus request is not limited to the case of the power off. The proxy apparatus request may be made, for example, in a case where the first terminal apparatus 131 transitions to a sleep mode or where load on the first terminal apparatus 131 exceeds a predetermined threshold.

In this exemplary embodiment, the proxy apparatus request is made if a specific condition is satisfied, for example, if the first terminal apparatus 131 is turned off.

In other words, in this exemplary embodiment, if the first terminal apparatus 131 is in a specific state, the post-processing information is transmitted to the receiving apparatus 300 via the different terminal apparatus 100.

In the example above, if the first terminal apparatus 131 is in the specific state, the destination information is transmitted from the processing apparatus 200 to the different terminal apparatus 100, and thereby the post-processing information is transmitted to the receiving apparatus 300.

The specific state is not limited to the power off state and includes a state of the sleep mode and the state where the load exceeds the predetermined threshold.

The case where the first terminal apparatus 131 generates the password taken as an example of the identification has been described as an example. However, an apparatus different from the first terminal apparatus 131 may generate the password.

Specifically, for example, the processing apparatus 200 may generate the password and transmit the password to the second terminal apparatus 132 via the first terminal apparatus 131 that has not turned off yet.

Also in this case like the above case, if the password held by the processing apparatus 200 matches the password held by the second terminal apparatus 132, the post-processing information generated by the processing apparatus 200 is transmitted to the second terminal apparatus 132.

An identification other than the password may also be used.

An IP address uniquely identifying the second terminal apparatus 132 or a MAC address may be used as the identification other than the password.

In this case, for example, the first terminal apparatus 131 acquires the IP address or the MAC address of the second terminal apparatus 132 and transmits the IP address or the MAC address to the processing apparatus 200. The processing apparatus 200 then acquires and stores the IP address or the MAC address.

In this case, if the IP address or the MAC address held by the processing apparatus 200 matches the IP address or the MAC address transmitted later from the second terminal apparatus 132 to the processing apparatus 200, the post-processing information generated by the processing apparatus 200 is transmitted to the second terminal apparatus 132, like the above case.

FIG. 13 is a diagram explaining processing performed in a case where the first terminal apparatus 131 in the power off state is turned on.

In this exemplary embodiment, to turn on the first terminal apparatus 131 in the power off state, the user first performs an operation of the first terminal apparatus 131 to turn on the first terminal apparatus 131 (step S201).

After the first terminal apparatus 131 in the power off state is turned on, the first terminal apparatus 131 identifies processing yet to be completed.

To identify the processing yet to be completed, for example, the first terminal apparatus 131 inquires of the processing apparatus 200 about a progress state (step S202).

In response to the inquiry, the processing apparatus 200 refers to the management table KT of the processing apparatus 200 and determines whether a terminal apparatus 100 serving as the proxy apparatus is registered in the management table KT.

For example, if the second terminal apparatus 132 is registered as the proxy terminal apparatus 100, the processing apparatus 200 transmits the information indicating that the proxy terminal apparatus 100 is registered, to the first terminal apparatus 131 (step S203).

More specifically, if the second terminal apparatus 132 is registered in the management table KT because step S130 is performed (see FIG. 11), the processing apparatus 200 transmits the information indicating that the proxy terminal apparatus 100 is registered, to the first terminal apparatus 131.

In this case, the first terminal apparatus 131 terminates the processing (step S204).

In this case, the second terminal apparatus 132 is to transmit or has transmitted the post-processing information. Even if the first terminal apparatus 131 does not perform processing, a malfunction does not occur.

In contrast, if the proxy terminal apparatus 100 is not registered, the processing apparatus 200 transmits the information indicating that the proxy terminal apparatus 100 is not registered, to the first terminal apparatus 131 (step S205).

Specifically, if the second terminal apparatus 132 is not registered in the management table KT because step S130 is not performed, the processing apparatus 200 transmits the information indicating that the proxy terminal apparatus 100 is not registered, to the first terminal apparatus 131.

In this case, the first terminal apparatus 131 transmits the post-processing information to the receiving apparatus 300 (step S206).

Specifically, in this case, the first terminal apparatus 131 performs steps starting from step S111 in FIG. 5.

In the steps starting from step S111 in FIG. 5 performed by the first terminal apparatus 131, the first terminal apparatus 131 receives the post-processing information and the destination information from the processing apparatus 200 and then transmits the post-processing information to the receiving apparatus 300 identified from the destination information.

In the processing example illustrated in FIG. 13, the case where the first terminal apparatus 131 determines whether to perform the processing on the basis of whether the proxy terminal apparatus 100 is registered in the management table KT has been described taken as an example.

Alternatively, the first terminal apparatus 131 may determine whether to perform the processing, for example, on the basis of whether the post-processing information has been transmitted to the terminal apparatus 100 to serve as the proxy apparatus.

Specifically, in this case, for example, the processing apparatus 200 stores information (hereinafter, referred to as history information) regarding a history indicating whether the post-processing information has been transmitted to the proxy terminal apparatus 100.

When the first terminal apparatus 131 is turned on, whether the post-processing information has been transmitted to the proxy terminal apparatus 100 is determined on the basis of the history information.

If the post-processing information has been transmitted to the proxy terminal apparatus 100, the first terminal apparatus 131 terminates the processing.

If the post-processing information has not been transmitted to the proxy terminal apparatus 100 yet, the first terminal apparatus 131 transmits the post-processing information to the receiving apparatus 300.

In the processing described above, even if the first terminal apparatus 131 is turned off, the post-processing information may be transmitted to the receiving apparatus 300.

In this exemplary embodiment, as described above, if the identifications match, the post-processing information may be transmitted from the processing apparatus 200 to the second terminal apparatus 132 and from the second terminal apparatus 132 to the receiving apparatus 300.

In this exemplary embodiment, the image processing that is processing of the image data acquired by the first terminal apparatus 131 is performed by the processing apparatus 200 different from the first terminal apparatus 131, not by the first terminal apparatus 131.

In this exemplary embodiment, high-level and high-speed image processing may be achieved more easily than in a case where the terminal apparatuses 100 individually perform the image processing.

In the case where the image processing is performed by the processing apparatus 200, not by the terminal apparatuses 100 individually, well-provided hardware resources for the image processing are achieved more easily, and the performance of the image processing may be enhanced.

In this case, high-level and high-speed image processing may be achieved more easily than in the case where the terminal apparatuses 100 individually perform the image processing.

In this exemplary embodiment, the firewall FW (see FIG. 1) is present between the processing apparatus 200 taken as an example of the external apparatus and the network connecting the terminal apparatuses 100 and the receiving apparatus 300.

In this case, to transmit the post-processing information directly from the processing apparatus 200 to the receiving apparatus 300, the firewall FW is required to have a setting to permit the transmission, thus leading to lower security performance.

Hence, in this exemplary embodiment, the post-processing information is not transmitted directly from the processing apparatus 200 to the receiving apparatus 300. The post-processing information is once transmitted from the processing apparatus 200 to one of the terminal apparatuses 100 and thereafter transmitted to the receiving apparatus 300 via the terminal apparatus 100.

However, in transmitting the post-processing information to the receiving apparatus 300 via the terminal apparatus 100, for example, turning off the terminal apparatus 100 as in the case of the first terminal apparatus 131 causes a malfunction.

Specifically, there arises a malfunction such as a failure of the transmission of the post-processing information to the receiving apparatus 300 or a delay in the transmission of the post-processing information to the receiving apparatus 300.

To address this in this exemplary embodiment, the second terminal apparatus 132 transmits the post-processing information on behalf of the first terminal apparatus 131, as described above.

In this case, the malfunction such as the failure of the transmission of the post-processing information to the receiving apparatus 300 or the delay in the transmission of the post-processing information to the receiving apparatus 300 is less likely to occur.

In this exemplary embodiment, in the case where the different terminal apparatus 100 such as the second terminal apparatus 132 transmits the post-processing information on behalf of the first terminal apparatus 131, whether the identifications such as the passwords match is determined as described above.

If the identifications match, the post-processing information is transmitted to the different terminal apparatus 100, and the post-processing information is transmitted to the receiving apparatus 300 via the different terminal apparatus 100.

In the case where whether the identifications match is determined as described above, the occurrence of access by a malicious user to the processing apparatus 200 via the terminal apparatus 100 may be reduced, and thus the occurrence of image data leakage may be reduced.

In this exemplary embodiment, in the case where the terminal apparatus 100 to transmit the post-processing information to the receiving apparatus 300 is changed to the different terminal apparatus 100, the different terminal apparatus 100 acquires the destination information.

Specifically, in this exemplary embodiment, the destination information is transmitted to the different terminal apparatus 100 such as the second terminal apparatus 132, and the different terminal apparatus 100 acquires the destination information.

In this exemplary embodiment, the post-processing information may thereby be transmitted to the receiving apparatus 300 not only from the terminal apparatus 100 that has transmitted the transmission information to the processing apparatus 200 but also via the different terminal apparatus 100 different from the terminal apparatus 100.

Note that, for example, to transmit the transmission information from the first terminal apparatus 131 to the processing apparatus 200, the flowing aspect is also conceivable. The first terminal apparatus 131 transmits only the image data to the processing apparatus 200 without transmitting the destination information to the processing apparatus 200.

In this aspect, the post-processing information may be transmitted to the receiving apparatus 300 only via the first terminal apparatus 131, and it is not possible to transmit the post-processing information via a different terminal apparatus 100 other than the first terminal apparatus 131.

Specifically, in this aspect, only the first terminal apparatus 131 holds the destination information, and it is not possible to transmit the post-processing information via the different terminal apparatus 100 other than the first terminal apparatus 131.

In contrast in this exemplary embodiment, as described above, the destination information is transmitted to the second terminal apparatus 132, and the second terminal apparatus 132 holds the destination information.

In this exemplary embodiment, the post-processing information may thereby be transmitted via the different terminal apparatus 100 such as the second terminal apparatus 132.

In the processing example described above, in transmitting the destination information, to the terminal apparatus 100 to transmit the post-processing information to the receiving apparatus 300, from the terminal apparatus 100 that transmits the transmission information to the processing apparatus 200, the destination information that is not routed through the processing apparatus 200 is not transmitted.

That is, in the processing example described above, the destination information is not transmitted directly from the first terminal apparatus 131 to the second terminal apparatus 132 but is transmitted from the first terminal apparatus 131 to the second terminal apparatus 132 via the processing apparatus 200.

Note that the description above does not exclude the configuration in which the destination information is transmitted directly from the first terminal apparatus 131 to the second terminal apparatus 132. The destination information may be transmitted from both of the first terminal apparatus 131 and the processing apparatus 200 to the second terminal apparatus 132.

In this exemplary embodiment, the destination information is transmitted from the processing apparatus 200 to one of the terminal apparatuses 100 that serves as the proxy apparatus to transmit the post-processing information to the receiving apparatus 300.

The terminal apparatus 100 serving as the proxy apparatus to transmit the post-processing information to the receiving apparatus 300 thereby acquires the destination information. The post-processing information may thereby be transmitted via the terminal apparatus 100 serving as the proxy apparatus for the transmission.

In the configuration in which the destination information is transmitted directly from the first terminal apparatus 131 to the second terminal apparatus 132, the terminal apparatus 100 serving as the proxy apparatus to transmit the post-processing information to the receiving apparatus 300 is required to be decided in advance.

In contrast, in the configuration in which the destination information is once transmitted to the processing apparatus 200, the terminal apparatus 100 serving as the proxy apparatus to transmit the post-processing information to the receiving apparatus 300 may be decided later.

In the configuration in which the destination information is once transmitted to the processing apparatus 200, the proxy terminal apparatus 100 may be decided after the terminal apparatus 100 that has transmitted the transmission information enters into the predetermined state such as the state where the first terminal apparatus 131 is turned off.

In the example above, the second terminal apparatus 132 serving as the proxy apparatus is decided before the first terminal apparatus 131 is turned off. However, in the configuration in which the destination information is transmitted to the processing apparatus 200, the second terminal apparatus 132 may be decided even after the first terminal apparatus 131 is turned off.

In a different processing example, if a predetermined specific condition is satisfied, transmission of the destination information from the processing apparatus 200 to the terminal apparatus 100 may be prohibited.

Specifically, for example, if the terminal apparatus 100 to transmit, to the receiving apparatus 300, the post-processing information transmitted from the processing apparatus 200 is the terminal apparatus 100 that has transmitted the transmission information to the processing apparatus 200, transmission of the destination information from the processing apparatus 200 to the terminal apparatus 100 may be prohibited.

In other words, if the terminal apparatus 100 to transmit, to the receiving apparatus 300, the post-processing information transmitted from the processing apparatus 200 matches the terminal apparatus 100 that has transmitted the transmission information to the processing apparatus 200, transmission of the destination information from the processing apparatus 200 to the terminal apparatus 100 may be prohibited.

Specifically, for example, assume a case where the first terminal apparatus 131 has transmitted the transmission information as described above, where the power off operation or the like is not performed on the first terminal apparatus 131, and where the first terminal apparatus 131 is transmit, to the receiving apparatus 300, the post-processing information transmitted from the processing apparatus 200.

In this case, transmission of the destination information from the processing apparatus 200 to the first terminal apparatus 131 may be prohibited.

In addition, for example, assume a case where the first terminal apparatus 131 in the power off state is turned on, where the post-processing information has not been transmitted yet from the processing apparatus 200 to the terminal apparatus 100, and where the first terminal apparatus 131 is to transmit, to the receiving apparatus 300, the post-processing information transmitted from the processing apparatus 200.

Also in this case, transmission of the destination information from the processing apparatus 200 to the first terminal apparatus 131 may be prohibited.

The first terminal apparatus 131 originally has the destination information. Even if the destination information is not transmitted from the processing apparatus 200 to the first terminal apparatus 131, the first terminal apparatus 131 may transmit the post-processing information to the receiving apparatus 300.

In this exemplary embodiment, the CPU 211 of the processing apparatus 200 transmits the destination information to the terminal apparatus 100. However, if the specific condition is satisfied, the CPU 211 of the processing apparatus 200 may be configured not to transmit the destination information to the first terminal apparatus 131.

Specifically, if the terminal apparatus 100 to transmit the post-processing information to the receiving apparatus 300 matches the terminal apparatus 100 that has transmitted the transmission information to the processing apparatus 200, the CPU 211 of the processing apparatus 200 may be configured not to transmit the destination information to the first terminal apparatus 131.

In other words, if the post-processing information acquired by processing the transmission information from the terminal apparatus 100 is transmitted to the receiving apparatus 300 via one of the terminal apparatuses 100, the CPU 211 of the processing apparatus 200 may be configured not to transmit the destination information to the terminal apparatus 100.

In the description above, the processing assumes the post-processing information generated by the processing apparatus 200 is returned to the first terminal apparatus 131.

Alternatively, for example, the processing may assume that the post-processing information generated by the processing apparatus 200 is returned to a different terminal apparatus 100 other than the terminal apparatus 100 that has transmitted the transmission information.

In other words, the post-processing information generated by the processing apparatus 200 may be returned to a different terminal apparatus 100 different from the terminal apparatus 100 that has transmitted the transmission information to the processing apparatus 200.

In this case, if the different terminal apparatus 100 enters into a specific state such as the power off state, the same processing as described above is performed, and a proxy terminal apparatus 100 different from the different terminal apparatus 100 transmits the post-processing information to the receiving apparatus 300.

A candidate for the proxy terminal apparatus 100 includes the terminal apparatus 100 that has transmitted the transmission information to the processing apparatus 200.

If the different terminal apparatus 100 enters into the specific state such as the power off state, the terminal apparatus 100 that has transmitted the transmission information to the processing apparatus 200 may serve as the proxy terminal apparatus 100.

Alternatively, when making the request described above of the proxy terminal apparatus 100, the terminal apparatus 100 that has transmitted the transmission information to the processing apparatus 200 (hereinafter, referred to as a transmission terminal apparatus 100) may inquire of possible proxy terminal apparatuses 100.

Specifically, in this case, the terminal apparatus 100 inquires of the transmission terminal apparatuses 100 that are the possible proxy apparatus candidates and thereby acquires information regarding the state of each candidate terminal apparatus 100.

The transmission terminal apparatus 100 then decides one of the terminal apparatuses 100 to request the role of the proxy apparatus on the basis of the acquired state information.

In this case, the transmission terminal apparatus 100 decides, as the proxy terminal apparatus 100, one of the terminal apparatuses 100 in a specific state such as a power on state or a low load state.

In this case, the destination information is transmitted to one of the different terminal apparatuses 100 that is in the specific state, and the post-processing information is transmitted to the receiving apparatus 300 via the different terminal apparatus 100 in the specific state.

Alternatively, the proxy terminal apparatus 100 may be decided by, for example, the processing apparatus 200, not by the first terminal apparatus 131.

If the processing apparatus 200 decides the proxy terminal apparatus 100, the processing apparatus 200 acquires, for example, information regarding the state of each terminal apparatus 100 and identifies the terminal apparatus 100 satisfying the specific condition on the basis of the acquired information. The processing apparatus 200 then decides the identified terminal apparatus 100 as the proxy terminal apparatus 100.

The processing apparatus 200 then transmits the destination information and the post-processing information to the decided terminal apparatus 100.

Specifically, in this case, the CPU 211 of the processing apparatus 200 transmits the post-processing information and the destination information to one of the terminal apparatuses 100 that is in the specific state.

More specifically, in the case where the post-processing information is transmitted to the receiving apparatus 300 via a different terminal apparatus 100 different from the first terminal apparatus 131, the CPU 211 of the processing apparatus 200 transmits the post-processing information and the destination information to one of the different terminal apparatuses 100 that is in the specific state.

More specifically, in this case, the CPU 211 of the processing apparatus 200 decides, as the proxy terminal apparatus 100, one of the terminal apparatuses 100 in the specific state such as a power on state or a low load state.

The CPU 211 of the processing apparatus 200 transmits the destination information and the post-processing information to the decided terminal apparatus 100.

In the description above, the information regarding one of the terminal apparatuses 100 that serves as the proxy apparatus is transmitted from the first terminal apparatus 131 to the processing apparatus 200.

Specifically, in the description above, the information regarding the second terminal apparatus 132 that is one of the terminal apparatuses 100 that serves as the proxy apparatus is transmitted from the first terminal apparatus 131 to the processing apparatus 200.

The information transmitted regarding one of the terminal apparatuses 100 that serves as the proxy apparatus from the first terminal apparatus 131 to the processing apparatus 200 is not limited to the information regarding one of the terminal apparatuses 100, and information regarding multiple terminal apparatuses 100 may be transmitted.

In this case, to transmit the post-processing information to the terminal apparatus 100, the processing apparatus 200 acquires information regarding the state of each terminal apparatus 100.

The processing apparatus 200 identifies one of the terminal apparatuses 100 that is in the specific state on the basis of the acquired information and decides the identified terminal apparatus 100 as the proxy terminal apparatus 100.

Like the case described above, the processing apparatus 200 transmits the destination information and the post-processing information to the decided terminal apparatus 100.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   a plurality of terminal apparatuses, each of the terminal apparatuses being an image forming apparatus;
   a processor implemented with hardware that processes transmission information transmitted from a terminal apparatus of the plurality of terminal apparatuses and that generates post-processing information to be transmitted to a receiving apparatus server via the terminal apparatus that has transmitted the transmission information of the plurality of terminal apparatuses; and
   a firewall that separates the plurality of terminal apparatuses and the receiving apparatus server from the processor implemented with hardware that processes transmission information, such that the processor is outside of the firewall and the terminal apparatuses are inside the firewall,
   the terminal apparatus transmitting the transmission information to the processor across the firewall and transmitting destination information regarding the receiving apparatus server to the processor,
   wherein the post-processing information generated by the processor is transmitted to the receiving apparatus server across the firewall via a terminal apparatus of the plurality of terminal apparatuses,
   wherein when the terminal apparatus that has transmitted the transmission information is in a specific state, the post-processing information is transmitted to the receiving apparatus server across the firewall via a different terminal apparatus of the plurality of terminal apparatuses that is different from the terminal apparatus,
   wherein when the terminal apparatus that has transmitted the transmission information is in the specific state, the destination information is transmitted from the processor to the different terminal apparatus across the firewall, and
   wherein the specific state includes one of an off state, a sleep mode, and a state where a processing load exceeds a predetermined threshold.

2. The information processing system according to claim 1,
   wherein the destination information is transmitted to the different terminal apparatus, and the post-processing information is transmitted to the receiving apparatus server via the different terminal apparatus.

3. The information processing system according to claim 1,
   wherein the destination information is transmitted from the processor to a terminal apparatus of the plurality of terminal apparatuses that is to transmit the post-processing information generated by the processor to the receiving apparatus server.

4. The information processing system according to claim 3,
   wherein when the terminal apparatus to transmit the post-processing information generated by the processor to the receiving apparatus server is the terminal apparatus of the plurality of terminal apparatuses that has transmitted the transmission information to the processor, the destination information is not transmitted to the terminal apparatus.

5. The information processing system according to claim 1,
   wherein in transmitting the destination information, to a terminal apparatus of the plurality of terminal apparatuses that is to transmit the post-processing information to the receiving apparatus server, from the terminal apparatus that transmits the transmission information to the processor, the destination information that is not routed through the processor is not transmitted.

6. The information processing system according to claim 1,
   wherein in response to an identification held by the processor matching an identification held by a terminal apparatus of the plurality of terminal apparatuses that is to transmit the post-processing information to the receiving apparatus server, the post-processing information is transmitted from the processor to the terminal apparatus, and the post-processing information is transmitted to the receiving apparatus server via the terminal apparatus.

7. The information processing system according to claim 6,
   wherein in response to the identification held by the processor matching the identification held by the terminal apparatus that is to transmit the post-processing information to the receiving apparatus server, the destination information is transmitted from the processor to the terminal apparatus, and the post-processing information is transmitted from the terminal apparatus to the receiving apparatus server by using the destination information.

8. An information processing apparatus comprising:
   a processor implemented with hardware that is configured to:
      process information output from a terminal apparatus and then generate post-processing information to be transmitted to a receiving apparatus server via the terminal apparatus or a different terminal apparatus, each of the terminal apparatus and the different terminal apparatus being an image forming apparatus;

communicate with (i) the terminal apparatus or the different terminal apparatus and (ii) communicate indirectly with the receiving apparatus server via the terminal apparatus or the different terminal apparatus, across a firewall that separates the processor from (i) the terminal apparatus or the different terminal apparatus and (ii) the receiving apparatus server, such that the processor is outside of the firewall;

acquire destination information regarding the receiving apparatus server, the destination information being output from the terminal apparatus across the firewall; and in transmitting the post-processing information to the receiving apparatus server via the different terminal apparatus, transmit the destination information to the different terminal apparatus back across the firewall, and wherein when the terminal apparatus is in a specific state, the post-processing information is transmitted to the receiving apparatus server across the firewall via the different terminal apparatus, wherein when the terminal apparatus is in the specific state, the destination information is transmitted from the processor to the different terminal apparatus across the firewall, and wherein the specific state includes one of an off state, a sleep mode, and a state where a processing load exceeds a predetermined threshold.

9. The information processing apparatus according to claim 8, wherein the processor is configured not to:

in transmitting the post-processing information to the receiving apparatus server via the terminal apparatus, transmit the destination information to the terminal apparatus.

10. The information processing apparatus according to claim 8, wherein the processor is configured to:

in transmitting the post-processing information to the receiving apparatus server via the different terminal apparatus, transmit the post-processing information and the destination information to a different terminal apparatus of a plurality of the different terminal apparatuses.

11. A non-transitory computer readable medium storing a program causing a computer to execute a process comprising:

processing information output from a terminal apparatus and then generating post-processing information to be transmitted to a receiving apparatus server via the terminal apparatus or a different terminal apparatus, each of the terminal apparatus and the different terminal apparatus being an image forming apparatus;

communicating with (i) the terminal apparatus or the different terminal apparatus and (ii) communicating indirectly with the receiving apparatus server via the terminal apparatus or the different terminal apparatus, across a firewall that separates the computer from (i) the terminal apparatus or the different terminal apparatus and (ii) the receiving apparatus server, such that the computer is outside of the firewall, acquiring destination information regarding the receiving apparatus server, the destination information being output from the terminal apparatus across the firewall; and in transmitting the post-processing information to the receiving apparatus server via the different terminal apparatus, transmitting the destination information to the different terminal apparatus back across the firewall, and wherein when the terminal apparatus is in a specific state, the post-processing information is transmitted to the receiving apparatus server across the firewall via the different terminal apparatus, wherein when the terminal apparatus is in the specific state, the destination information is transmitted to the different terminal apparatus across the firewall, and wherein the specific state includes one of an off state, a sleep mode, and a state where a processing load exceeds a predetermined threshold.

* * * * *